Patented Sept. 15, 1936

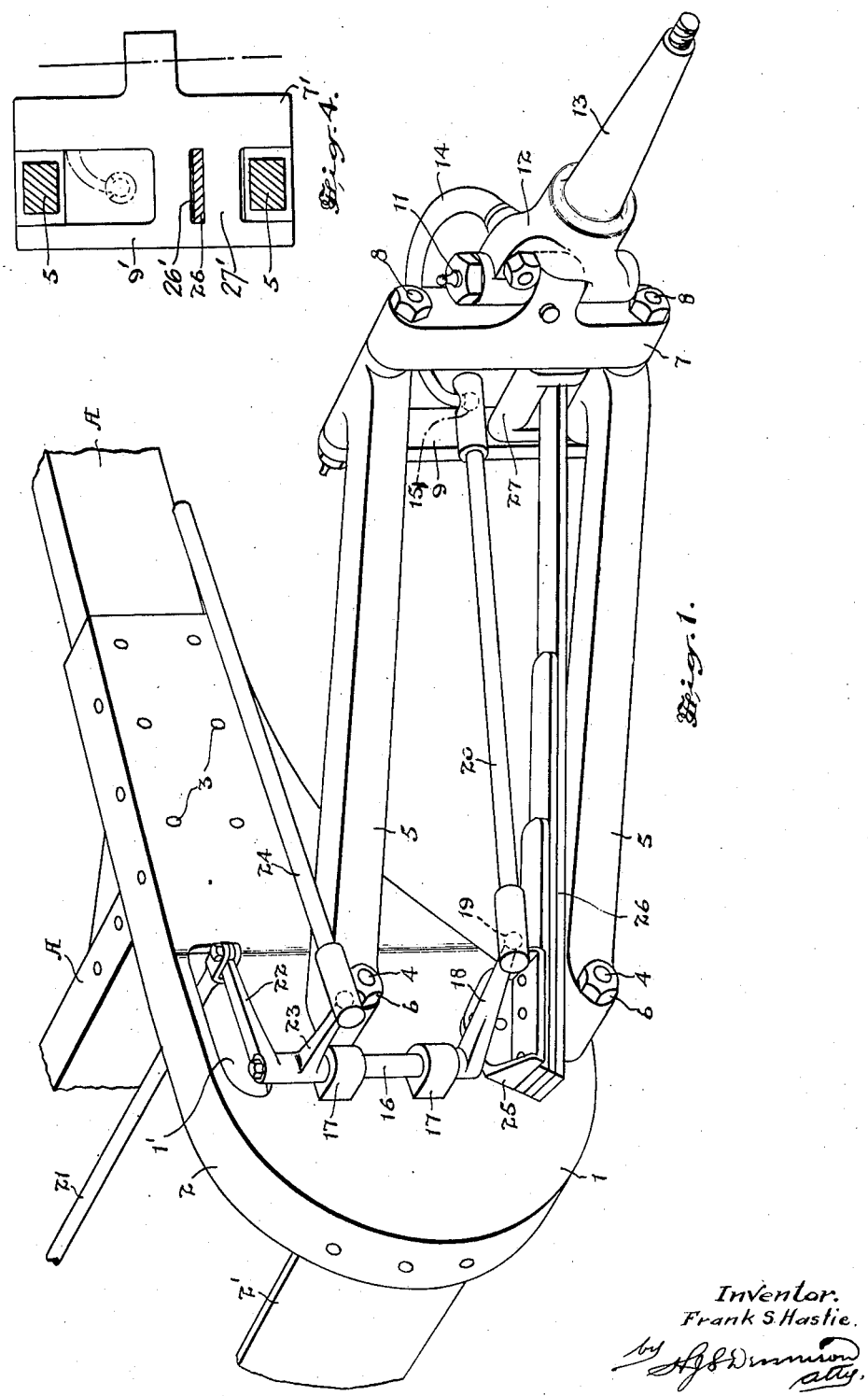

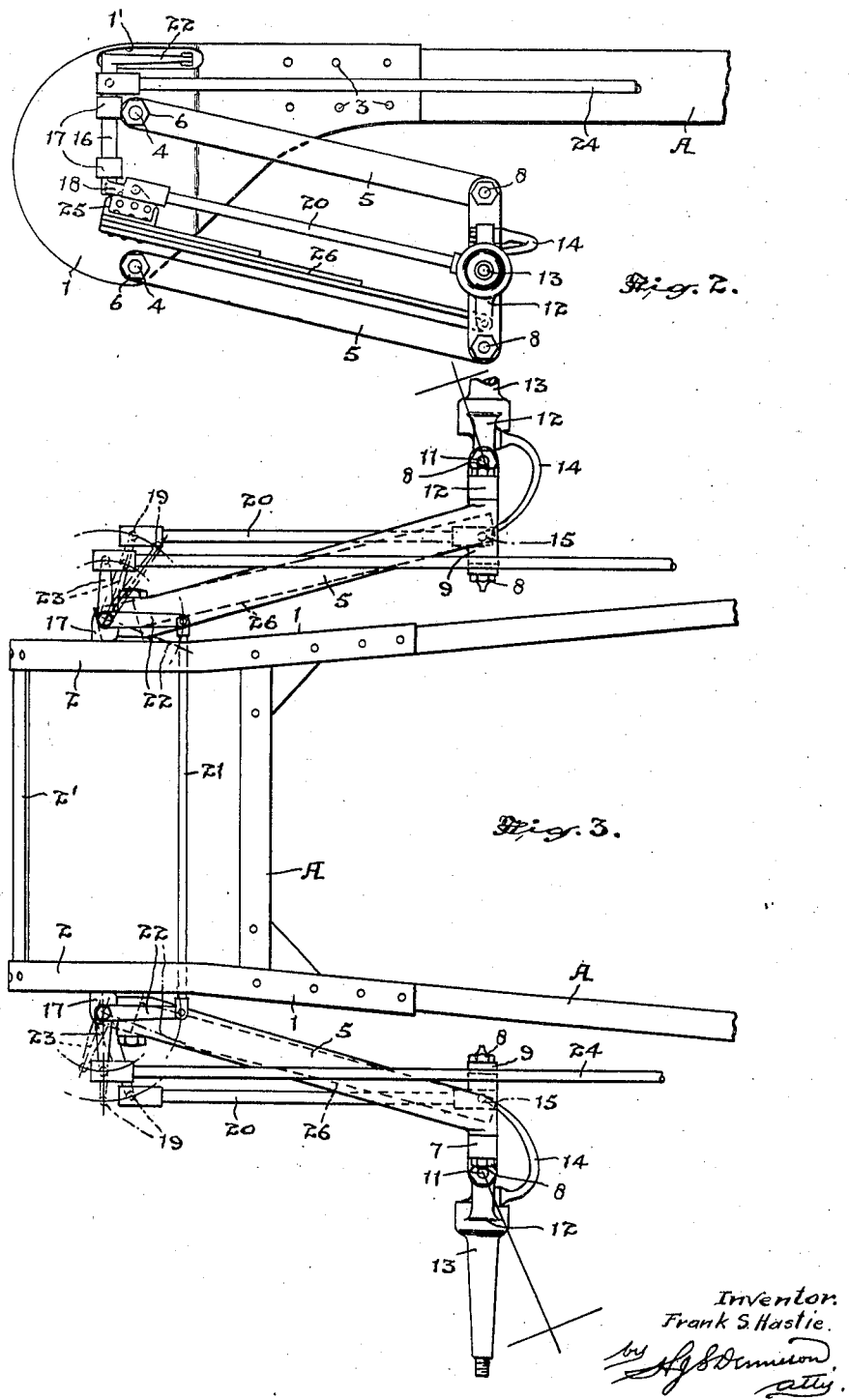

2,054,288

UNITED STATES PATENT OFFICE 2,054,288

INDEPENDENT WHEEL SUSPENSION FOR MOTOR VEHICLES

Frank S. Hastie, Toronto, Ontario, Canada

Application January 11, 1935, Serial No. 1,329

8 Claims. (Cl. 280—124)

The principal objects of this invention are to provide an improved type of individual wheel suspension of simple and rugged construction and which may be readily assembled and will form an extremely flexible and dependable support for the vehicle, and to provide in conjunction therewith an improved form of steering mechanism which will eliminate the transmission of shocks originating in the individual suspension mechanism.
The principal feature of the invention resides in the novel manner of supporting the vehicle frame upon pairs of parallel arms pivotally mounted on brackets supported from the wheel axles and pivotally connected to the frame.
A further important feature resides in pivoting each of the dirigible road wheels directly on a floating link connecting the free ends of each pair of parallel arms and providing steering rod connections which extend parallel with the paired suspension arms to swing in unison therewith while maintaining a parallel relation thereto.

In the drawings, Figure 1 is a perspective view of a suspension and steering assembly constructed in accordance with the present invention showing the same assembled on the forward portion of a vehicle frame.

Figure 2 is a side elevational view of the structure shown in Figure 1 on a reduced scale.

Figure 3 is a plan view of the front end of a vehicle frame and the structure shown in Figure 2.

Figure 4 is a front elevational view of a modified form of connecting bracket for the suspension arms.

Many forms of structure have been proposed for the individual suspension of the road wheels of vehicles, and the present invention directs to an improved structure for this purpose.

In the illustrated form of the invention, A represents the chassis or frame of the vehicle. Rigidly secured to and extending forwardly from each side member of the frame is a rigid plate or bracket 1 which may be pressed from sheet metal and formed with flanges 2 for reinforcing purposes and to closely embrace the frame of the vehicle to which it may be secured by bolts or rivets 3.

Horizontal pivot bolts 4 are secured in vertically arranged pairs to each of the rigid brackets 1, and a rigid suspension arm 5 is oscillatably journalled at its forward end on each of said pivot bolts 4, being secured thereon by the nuts 6 or other suitable means. These arms extend angularly outward from the frame in a rearward direction and the free ends of each pair are pivotally connected together to a vertical link 7.

The bolts 8 connecting the member 7 with the arms are vertically spaced apart a distance corresponding to the vertical spacing of the pivot bolts 4 thus maintaining the arms in parallel relation, and a link member 9 connects the inward ends of the bolts 8.

The member 7 is provided with an outwardly projecting lug 10 in which the king pin 11 is secured. The steering knuckle 12 of the wheel axle 13 is pivotally mounted on the king pin at either side of the lug 10 and carries a rigid steering arm 14 of semi-circular form which is curved to extend forwardly around the link 7 to a position between the links 7 and 9, so that its ball end 15 is normally positioned midway between the axes of the pivot bolts 8.

A short shaft 16 is vertically journalled in paired lugs 17 extending outwardly from each bracket 1 forward of the pivot bolts 4, and each shaft 16 has at its lower end a crank extension 18 which is normally disposed at an angle extending outwardly and rearwardly and provided with a ball end 19, which in the normal position of the lever 18, is disposed in the vertical plane extending through the bolt axes 4.

Each of the ball ends 15 of the steering arms 14 has connected thereto a link 20 which extends forwardly between the parallelly spaced suspension arms 5, and these are pivotally connected at their forward ends with the ball ends 19 of the crank arms 18. The connections of the rods 20 with the ball elements 15 and 19 respectively are of a universal character, and the points 15 and 19 are preferably arranged so that the rods 20 will be supported thereby in parallel relation to the arms 5 so that the rods 20 will swing in parallel relation in unison with the swinging of the arms 5, and since the forward pivot point 19 is disposed in the plane connecting the pivot axes 4, the vertical oscillation imparted to the suspension arms 5 in normal operation of the vehicle will simply cause the steering arms 20 to oscillate about the respective pivots 15 and 19, and there will be no objectionable thrust imposed upon the steering crank arms 18 or wheel axles 13.

A tie rod 21 extends transversely of the vehicle frame through openings 1' in the bracket 1 and is connected at the respective ends with rearwardly extending crank arms 22 secured to the upper ends of the vertical shafts 16. One of the shafts 16 is provided with a crank arm 23 which extends outwardly substantially in right angular relation to the crank arms 22, and the steering arm or drag link 24 has a pivotal socket connection therewith.

Any desired type of spring support may be interposed between the chassis and the oscillatable suspension arm assembly, and according to the form shown in Figure 1, a bracket 25 may be secured to each of the frame brackets 1 and to this bracket is rigidly secured a spring 26 extending rearwardly in substantial parallel relation with the suspension arms 5 and having a suitable shackle connection or the like 27 with the links 7 and 9. The shackle 27 permits any slight variation in the effective length of the leaf spring relative to the length of the suspension arms 5 during oscillating movement thereof.

In the modified form of link construction shown in Figure 4, the element 7' and link 9' are shown as integrally connected by a cross portion 27' which has a socket opening 26' into which the extremity of the leaf spring 26 is inserted so that it engages the bracket element in pressure contact, permitting the spring to adjust itself slidably therein to accommodate any slight difference in movement between the spring element and the suspension arms 5.

It will be understood that if desired, other forms of springs may be arranged to support arms 5 in place of the leaf spring 26, without departing from the spirit of the invention.

While I have indicated the bracket members 1 as being formed separately from the frame A and secured thereto, these may, if desired, be formed as an integral extension of the side members of the frame, and numerous other variations may be made without departing from the spirit of the invention.

It is important to note that due to the rearward angular disposition of the crank arms 18 and the fact that these are simultaneously swung in opposite directions, that is, one forwardly and the other rearwardly, the effect is to produce a highly desirable accelerated turning of the "inner" wheel in comparison with the rate of turn of the "outer" wheel, regardless of the direction in which the turn is being made, so that scrubbing action on the tires is reduced to the minimum.

A transverse brace 2' connects the flanges 2 of the brackets 1 and eliminates any twisting action thereon, and also minimizes the strains imposed on the frame members A.

It will be noted that when the leaf spring structure 26 is employed it will definitely assist the arms 5 in supporting the same against transverse stresses.

What I claim as my invention is:

1. An individual wheel suspension for motor vehicles comprising the combination with the vehicle frame, of paired parallel suspension arms transversely pivoted on the frame, a wheel-supporting member pivotally linking the outer ends of said arms, and a leaf spring assembly anchored to the vehicle frame and extending substantially parallelly between said arms and engaging the bracket in frame-supporting contact.

2. An individual wheel suspension as claimed in claim 1, in which said leaf spring assembly is rigidly secured to the frame at one end adjacent the pivotal connection of said arms with the frame and extends substantially longitudinally of the arms and co-operates with said wheel-supporting member to impart a support to said arms against lateral thrust.

3. An individual wheel suspension, comprising the combination with the vehicle frame, of vertically paired suspension arms disposed at each side of the frame and pivotally connected at one end with the frame on vertically spaced transversely arranged pivots and having wheel-supporting brackets extending vertically between and pivotally connecting the other ends, and leaf spring assemblies anchored to said frame and having compensating relief couplings with said wheel-supporting brackets between their respective points of pivotal connection with the paired suspension arms.

4. Means as claimed in claim 3 in which said pivotal suspension arms are parallelly paired at each side of the vehicle frame, and shackle members pivotally associated with the wheel-supporting brackets are pivotally linked to the leaf spring elements.

5. Means as claimed in claim 3 in which said wheel supporting brackets are formed with a recess and the terminal ends of said leaf spring assemblies are inserted in said recesses and bear in relief pressure contact against the lower wall thereof.

6. An individual wheel suspension for motor vehicles comprising the combination with the vehicle frame, of parallelly-paired suspension arms transversely pivoted to the frame at one end and having a wheel-supporting member pivotally linking the other ends, a steering wheel pivoted on each of said linking members and having a steering lever extending partly about said member, a steering link pivotally connected to said steering arm on the inward side of said bracket and extending parallelly between said parallel suspension arms, and steering mechanism including a lever pivotally mounted on the vehicle frame and pivotally connected with said steering link at a point normally disposed in a vertical plane extending through the axes of the pivotal connections of said arms with the frame.

7. Means as claimed in claim 6 in which said steering mechanism includes a shaft vertically journalled on the frame in offset relation to a plane extending through the axes of pivotal connection of said arms with the frame.

8. A combined individual wheel suspension and steering assembly for motor vehicles, comprising the combination with the vehicle frame, of parallelly-paired suspension arms pivotally mounted on the frame at each side thereof on transverse pivots arranged in a common vertical plane, members pivotally linking the outer ends of said paired arms, wheel-supporting axles hinged to said link members and having steering arms extending about the links and terminating between the adjacent ends of the suspension arms, shafts vertically pivoted on said vehicle frame in offset relation to the common plane of disposition of the pivot axes of said arms and having lever extensions disposed in normal angular relation to said common plane, steering links pivotally connected to said steering wheel arms at one end and pivotally connected to the lever extensions of said shafts at points normally disposed in the said common plane of said arm axes, and means for swinging said shafts in unison.

FRANK S. HASTIE.